Patented Oct. 9, 1945

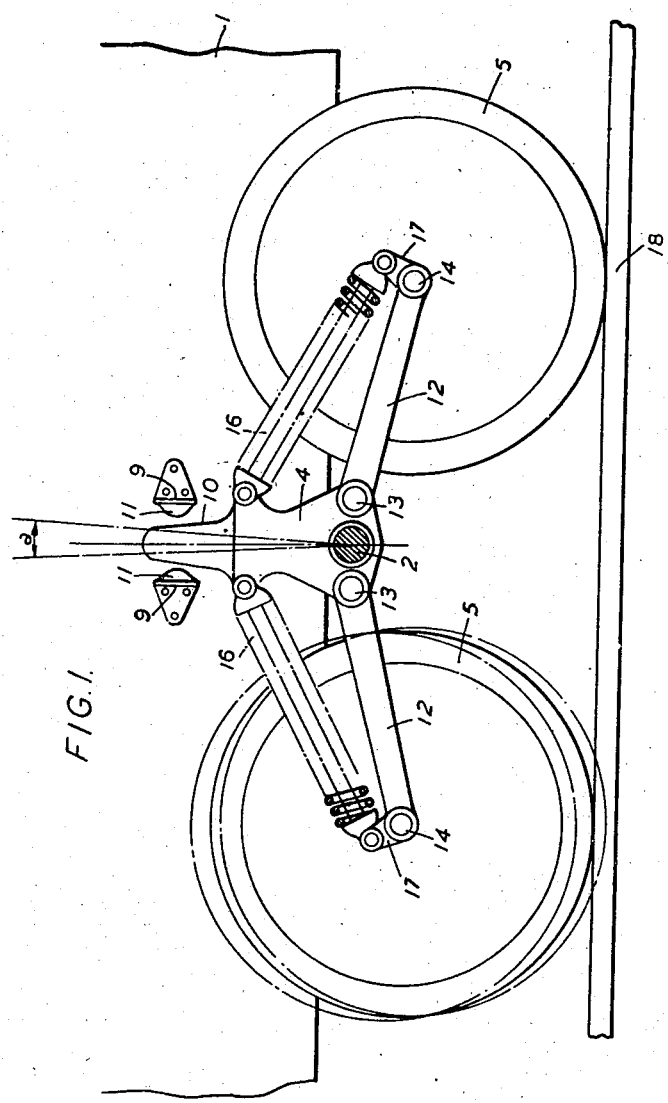

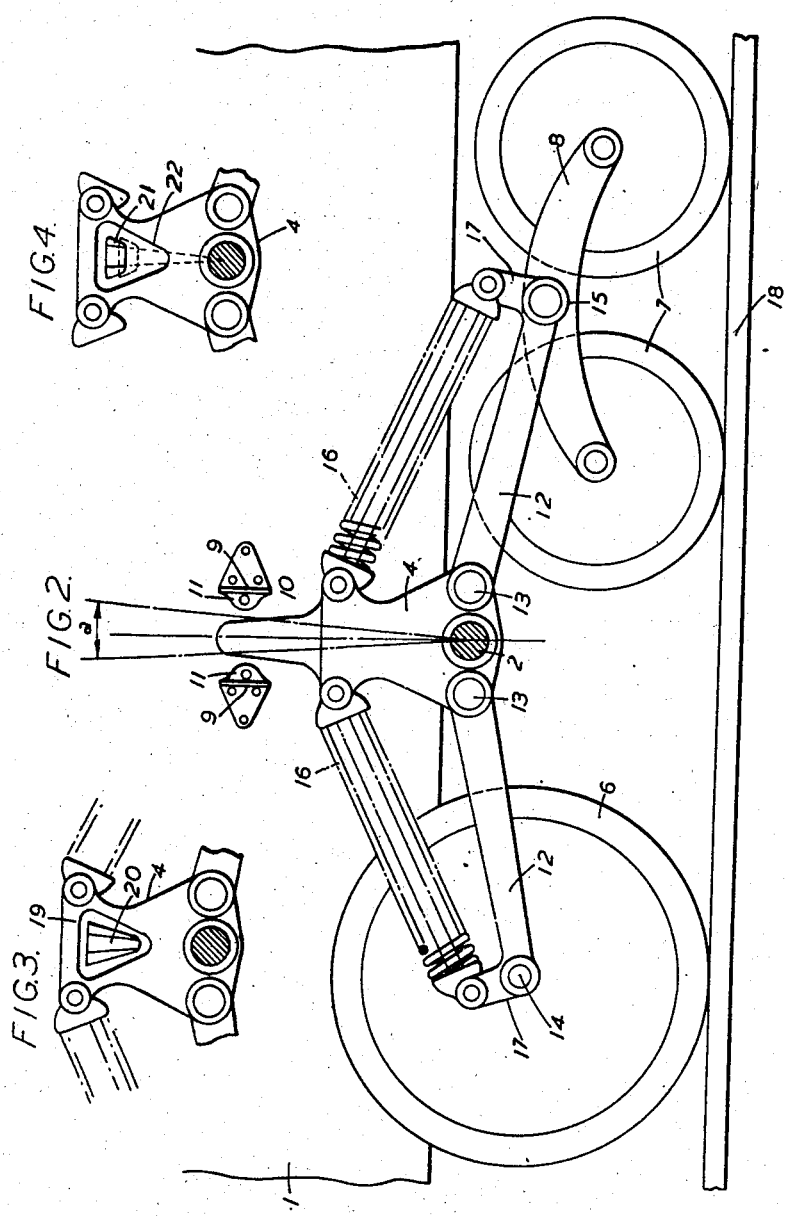

2,386,620

UNITED STATES PATENT OFFICE 2,386,620

ARTICULATED BOGIE FOR TRACK LAYING OR OTHER VEHICLES

Vivian Graham Loyd, Camberley, England

Application May 16, 1944, Serial No. 535,796
In Great Britain December 31, 1943

3 Claims. (Cl. 280—104.5)

This invention relates to articulated bogies, especially for track laying vehicles. The usual bogie type of suspension is arranged so that over normal road irregularities the suspension absorbs road shocks by articulating or "bogeying" about the axis of the appropriate suspension and thereby preventing movement taking place over the whole of the suspension and minimising wear, whilst over cross country the suspensions take care of the abnormal irregularities of the ground being traversed, the articulating action, plus the spring action, accommodating the rough ground irregularities more effectively than most other types of suspensions. The invention is also applicable to the landing wheels of aircraft which can be made with or without tracks.

Although the accommodation of the articulated bogies to the rough terrain is most effective in many respects, the arrangements thereof so far adopted result in undesirable pitching of the vehicle due to the very ready response of the suspension to the effect of the surface irregularities, and the chief object of this invention is to provide means having a steadying influence on the present undesirably uncontrolled articulation of the suspension.

According to this invention the suspension appropriate to each track wheel is adapted to yield, or to articulate in response to cross country or abnormal irregularities independently of, or relatively to, means adapted to afford articulation in response to normal road irregularities, a movement limiting device being provided to control within predetermined limits the articulation due to normal road irregularities.

In the preferred embodiment of the present invention the wheels are connected through independently operable suspension means to a common mounting bracket mounted to oscillate about the axis of a suspension axle or tube, stops being provided to limit the angle of oscillation of said mounting bracket, and spring means being incorporated in said independently operable suspension means to yield to shocks or displacements transmitted to the wheels due to cross country and abnormal irregularities, the arrangement being such that said stops are spaced to afford articulation of the whole suspension system within the limits normally required for normal road surface irregularities, and any further movements are absorbed by the spring means.

In order that the invention may be clearly understood and readily carried into effect drawings are appended hereto illustrating somewhat diagrammatically two embodiments thereof, wherein, Figure 1 is a side elevation showing the invention applied to a balanced or symmetrical type of bogie and wheels.

Figure 2 is a side elevation showing the invention applied to a suspension system embodying twin wheels carried by a rocking beam on one side of the axle or tube and a single wheel on the other side.

Figures 3 and 4 are fragmentary views illustrating modifications in which a single tapered adjustable stop is employed, these modifications being applicable to either of the types illustrated in Figures 1 and 2.

Referring to the drawings the hull or chassis 1 of the vehicle carries an axle or tube 2 which is mounted to articulate a centre bracket 4 common to both suspensions appropriate to the fore and aft track wheels. These wheels are shown in Figure 1 as identical wheels 5 with symmetrical suspensions, and in Figure 2 as a single wheel 6 on one side of the bracket 4 and a pair of smaller wheels 7 carried by a rocker beam 8 on the other side of the bracket. The track is indicated by the reference numeral 18.

The angle of oscillation $a$ of the bracket 4 is kept within the limits adequate for the requirements appropriate to the rise and fall of the said wheels for normal road surface irregularities by providing a pair of adjustable abutments 9 adjacent opposite sides of the bracket 4 and in proximity to a lug 10 integral with such bracket. These stops are formed with cushions to absorb the impact of the lug 10, such cushions preferably being rubber pads or blocks 11.

A pair of arms 12 are connected at their inner ends to the bracket 4 by pivot pins 13 in close proximity to the axle 2, such arms being bifurcated to receive the wheels 5, or the wheel 6 and beam 8, and the axles 14 (or axle 14 and journal 15 in the arrangement shown in Figure 2), appropriate thereto, so that such arms are free to articulate individually and relatively to the oscillatable bracket 4.

Two, or two pairs, of coiled compression springs 16 are connected across the bracket 4 and lugs 17 at the outer or free end of the arms 12, and the normal loaded compression of these springs is such that they will transmit the rise and fall of the wheels to the bracket 4 when the wheels negotiate normal irregularities on a road surface, with hardly perceptible increase in the compression of the springs, whereby the bracket 4 oscillates between the resilient stops 11 to allow articulation of the whole suspension within the range afforded by such stops. Any further movement due to abnormal irregularities is taken care of by the independent yield of the spring 16.

In the modification shown in Figure 3, the bracket 4, instead of having upward extension 10, has a hole 19 through which projects a metal abutment 20 faced with rubber on both sides. In Figure 4 a tapered plug 21 vertically adjustable on the hull can enter a pocket formed in the triangular rubber bearing 22.

By means of the present invention the pitching or rough riding which is due to the lack of steadying influence with existing "bogie" type suspensions on track laying vehicles is obviated or very appreciably minimised, resulting in reducing the wear on the tracks. That is to say for all normal road running there is just enough movement to meet the road irregularities, whilst on rough terrain, after the limit of articulation has been reached, i. e. when the lug 10 contacts the stops 11, the wheel suspensions act as independent units, and this is found to increase the stability of the vehicle.

What I claim and desire to secure by Letters Patent of the United States is:

1. An articulated bogie for a vehicle comprising a bracket mounted to oscillate upon an axle member, track wheels disposed opposite sides of said bracket, suspension arms carrying the wheels and mounted to pivot independently of said bracket, shock absorbing means arranged to transmit the rise and fall of the wheels to said bracket, and stops limiting the angle of movement of said bracket to within the approximate range to accommodate normal road surface irregularities, said shock absorbing means being yieldable relatively to said bracket to accommodate abnormal or rough terrain irregularities.

2. An articulated bogie for a vehicle comprising a bracket mounted to oscillate upon an axle member, track wheels disposed opposite sides of said bracket, suspension arms carrying the wheels and pivoted to said bracket, shock absorbing means connected across said arms and said bracket adapted to transmit the rise and fall of the wheels to said bracket, and stops limiting the angle of movement of said bracket to within the approximate range to accommodate normal road surface irregularities, said shock absorbing means being yieldable relatively to said bracket to accommodate abnormal or rough terrain irregularities.

3. An articulated bogie for a vehicle comprising a bracket mounted to oscillate upon an axle member, track wheels disposed opposite sides of said bracket, suspension arms carrying the wheels and pivoted to said bracket, coiled compression springs connected across said arms and said bracket adapted to transmit the rise and fall of the wheels to said bracket, cushioned stops limiting the angle of movement of said bracket to within the approximate range to accommodate normal road surface irregularities, said coiled compression springs being yieldable relatively to said bracket and arms to accommodate movements of the wheel axes beyond the range of movement afforded by said bracket to accommodate abnormal or rough terrain irregularities.

VIVIAN GRAHAM LOYD.